(No Model.)
H. JORDAN.
ART OF WELDING THE ENDS OF METAL TUBES.
No. 365,819. Patented July 5, 1887.
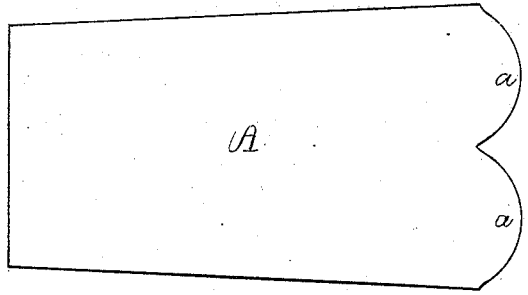
Fig. 1
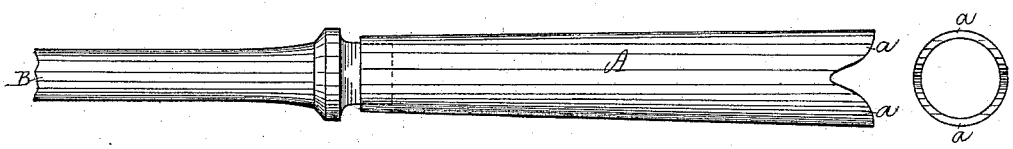
Fig. 2.
Fig. 3.
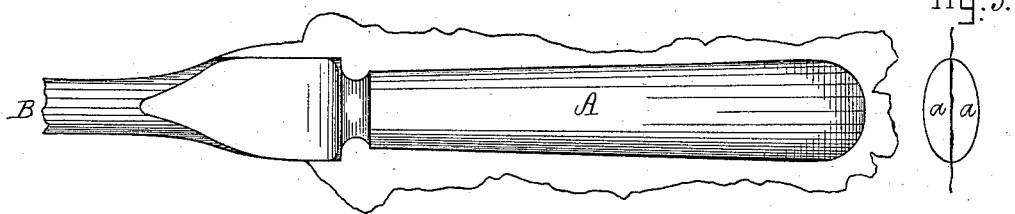
Fig. 4.
Fig. 5.
Witnesses:
Edward S. Peach,
John R. Snow.
Inventor
Horatio Jordan,
by J. E. Maynadier
atty.
N. PETERS. Photo-Lithographer. Washington, D. C.

UNITED STATES PATENT OFFICE.

HORATIO JORDAN, OF NORTHAMPTON, MASSACHUSETTS, ASSIGNOR TO WILLIAM-WILSON LEE, OF SAME PLACE.

ART OF WELDING THE ENDS OF METAL TUBES.

SPECIFICATION forming part of Letters Patent No. 365,819, dated July 5, 1887.

Application filed April 23, 1886. Serial No. 199,906. (No model.)

*To all whom it may concern:*

Be it known that I, HORATIO JORDAN, of Northampton, in the county of Hampshire and State of Massachusetts, have invented a new and useful Improvement in the Art of Welding the Ends of Metal Tubes, of which the following is a specification, reference being had to the accompanying drawings, forming a part hereof.

My invention consists, first, in shaping the end (of the tube) which is to be welded so as to form projections adapted to be bent inwardly toward each other before welding; secondly, in bending the projections inwardly toward each other; and, thirdly, in drop-forging the tube.

Hitherto it has been found very difficult to weld the ends of metal tubes satisfactorily, especially under drop-dies, and much time and labor have been expended by metal-workers in trying to accomplish the object of my invention, which, though of wide application in the metal arts, I here show embodied in a hollow metallic handle.

In the drawings, Figure 1 shows a metal blank adapted to be formed into a tube. Fig. 2 shows that tube and also an end view of it. Fig. 3 shows the tube with the lobes or projections *a* bent inwardly toward each other, and also an end view of it. Fig. 4 shows the blank after it has been welded and shaped between the dies. Fig. 5 is an end view of Fig. 4.

The projections *a a* are bent inwardly, as shown in Fig. 3, so that their edges are opposed. The tube A, with the blank B inserted, is then acted upon by the dies, whereby they are properly shaped and securely welded together, as shown in Figs. 4 and 5. The welds are butt-welds, for the metal forming the lobes *a a* is so confined by the dies that the lobes are forced together edge to edge, making a butt-weld. Heretofore in this kind of work the weld at the end of the tube or handle has been a lap-weld and not a butt-weld, and this is the main difference between my invention and the art as heretofore practiced, for where the end of the tube is not so shaped as to bring the parts edge to edge there must necessarily be two thicknesses of the sheet metal between the flat portions of the dies, thereby making a much heavier flash or fin than that shown in Figs. 4 and 5, and also leaving the joint exposed, when that flash or fin is removed, defective, the defects being often visible, but sometimes such as to escape detection until discovered by leakage of the plating solution after the handles have been finished up and put in stock.

I have found that the ends of the metal tubes are very perfectly and certainly welded together between the dies if the metal near the end of the tube be bent inwardly so as to nearly cross the end of the tube and bring the edges of the metal each opposite the other, substantially as shown in Fig. 3, so as to prevent the forming of any flash or fin except that due to the slight excess of metal at the shaped end of the tube. While I have shown the tubes as made from sheet metal, it will be clear that the tubes may be made by boring, as sometimes practiced.

I am aware of Patents No. 241,471, to Beecher, dated May 19, 1881, and No. 318,286, to Patterson, dated May 19, 1885, and I disclaim all that is shown in them, for in both the end of the tube is closed by a lap-weld, as distinguished from a butt-weld.

Of course I do not limit myself to the exact shape of the end shown in my drawings; but I claim as my invention—

The improved art herein described of butt-welding the ends of metal tubes, consisting in first shaping the end to be welded, then closing the end of the tube sufficiently to bring the edges each opposite to the other, and then heating and welding between dies shaped to force the inwardly-bent portions of the end of the tube together and form a butt-weld, substantially as and for the purpose set forth.

HORATIO JORDAN.

Witnesses:
WILLIAM W. LEE,
C. H. PIERCE.